UNITED STATES PATENT OFFICE.

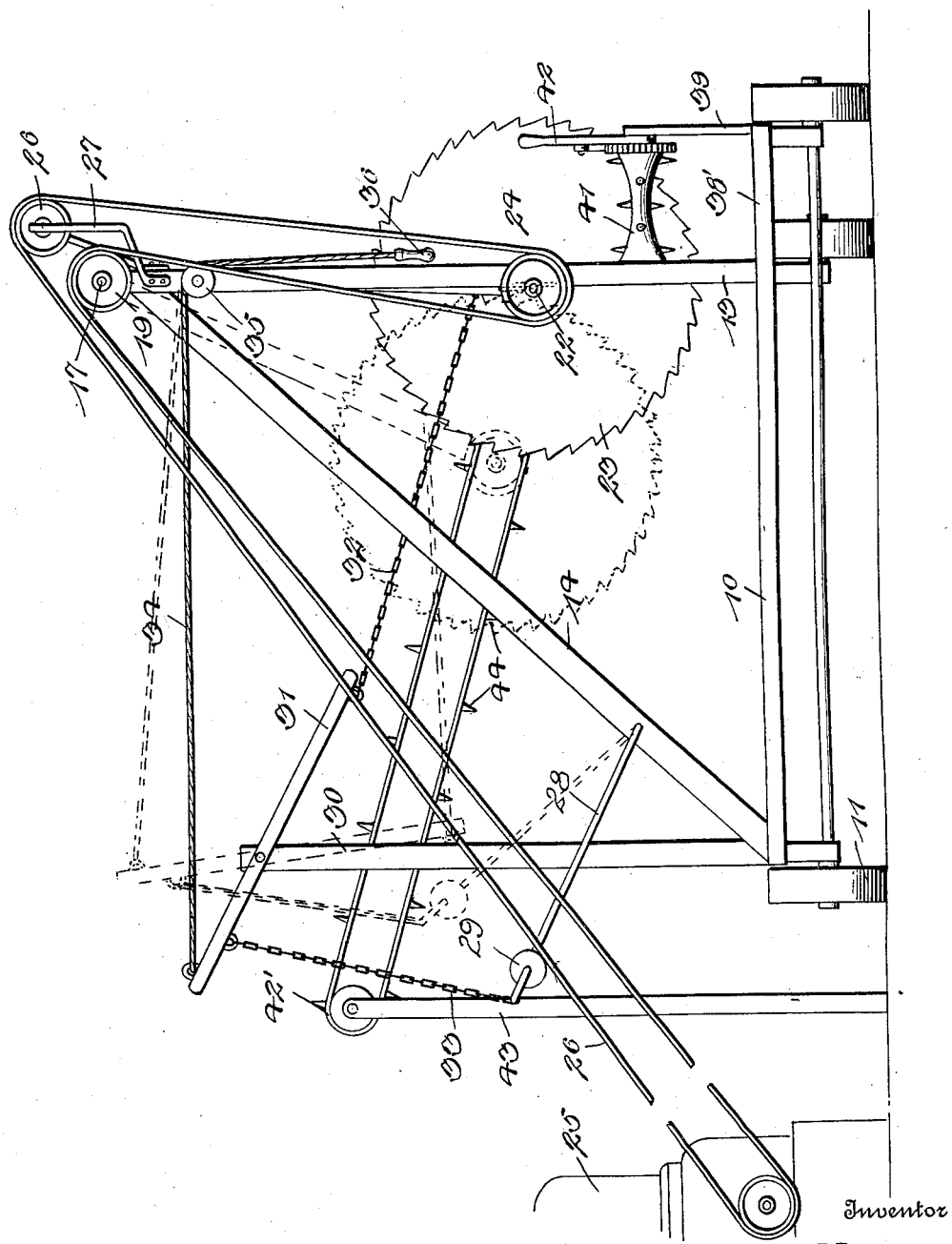

CHARLES W. ALLEN, OF BREEDSVILLE, MICHIGAN.

SAWING-MACHINE.

1,085,656. Specification of Letters Patent. Patented Feb. 3, 1914.

Application filed May 25, 1912. Serial No. 699,705.

*To all whom it may concern:*

Be it known that I, CHARLES W. ALLEN, a citizen of the United States, residing at Breedsville, in the county of Van Buren and State of Michigan, have invented certain new and useful Improvements in Sawing-Machines, of which the following is a specification, reference being had to the accompanying drawings.

The present invention relates to improvements in wood sawing machines and has for its primary object to provide means whereby the cutting of heavy timbers or logs may be greatly facilitated.

Another object of the invention resides in the provision of a movable saw carrying frame and operating means therefor, and means for moving the saw into and out of cutting position and simultaneously rendering the operating means effective or ineffective.

The invention has for a further object to generally improve and simplify the construction of machines of the above character and to produce a strong, durable and efficient machine which may be produced at comparatively small manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing wherein I have illustrated a side elevation of a wood sawing machine embodying the present invention.

Referring in detail to the drawing, 10 designates a supporting base or platform which is mounted upon suitable supporting wheels 11 whereby the machine may be readily moved from place to place. Any approved means may be employed for propelling the machine. Upon the base or platform 10, a plurality of vertical posts or uprights 13 are mounted, the same being braced by the diagonally disposed truss bars 14. It is of course understood that the supporting uprights are arranged upon opposite sides of the platform 10. Upon the upper ends of the corresponding uprights, a shaft 17 is mounted in suitable bearings. To one end of this shaft, a band wheel or pulley 19 is fixed whereby the same is driven.

Immediately beneath the shaft 17, a frame 20 is pivotally mounted at its upper end upon the superstructure mounted upon the platform 10. In the lower end of this frame, the shaft 22 is rotatably mounted. To one end of this shaft the saw blade 23 is fixed, the other end of the shaft being provided with the band wheel or pulley 24.

25 designates an engine or other suitable source of power from which the saw carrying shaft is driven through the medium of an endless belt 26, which extends around a pulley on the engine shaft and over the pulley 19. This belt then extends downwardly around the pulley 24 of the saw shaft, said belt then extending upwardly over a pulley 26' rotatably mounted in a supporting bracket 27 fixed upon one of the uprights 23.

28 designates a rod or arm which is pivotally mounted at one of its ends upon the truss bar 14. In the other end of said arm, a belt engaging roller 29 is arranged to bear upon the upper stretch of the driving belt 26. A vertically disposed post or upright 30 is mounted upon the platform 10 and on the upper end of said post a lever 31 is fulcrumed intermediate of its ends. One end of said lever is connected by means of the chain 32 to the saw carrying frame 20, while the chain 33 connects said lever adjacent to its other end to the rod or arm 28. A rope 34 is also connected to the latter end of the lever and is supported by a guide pulley 35 secured upon one of the uprights 13, the other end of said rope being provided with a suitable hand grip indicated at 36.

It will be understood from the foregoing description, that when the rope 34 is pulled, the lever 31 will be actuated to swing the saw carrying frame to the dotted line position shown in the drawing and simultaneously lift the roller 29 mounted in the arm 28 out of contact with the driving belt 26. The log or timber is fed to the saw by means of a spurred roller 41 which is actuated by the lever 42, said roller being mounted at its ends in a standard 39 and one of the uprights 13. For the purpose of properly positioning this feeding roller, the base or platform 10 is provided with an extension 38'. It is of course understood that when the pull upon the rope 34 is released, the saw blade 23 moves to its normal operative position by gravity, and the roller 29 again engages the driving belt 26 to properly tension the same so that the saw blade shaft will be driven thereby.

From the foregoing, it is believed that the construction and manner of operation of the invention will be clearly and fully understood. As the machine consists of comparatively few elements which are all of simple form, it will be obvious that the same is extremely strong and durable in operation and highly efficient in practical use.

While I have shown and described the preferred construction and arrangement of the several parts, the invention is susceptible of many minor modifications therein without departing from the essential features or sacrificing any of the advantages thereof except as defined by the scope of the appended claim.

What I claim is:—

In a wood sawing machine, the combination of a portable frame, a super-structure mounted thereupon, a depending auxiliary frame carried by said super-structure, a saw journaled within said auxiliary frame, a support carried by said frame, a lever fulcrumed upon said support, an arm carried by said super-structure, a roller journaled within said arm, an endless belt for operating said saw, the said roller adapted to rest upon said belt, means for connecting the said roller with one end of the said lever, means for flexibly connecting the auxiliary frame with the opposite end of said lever, and means for operating said lever, whereby the roller will be thrown into and out of engagement with the belt and the auxiliary frame may be jointly operated, substantially as described.

In testimony whereof I hereunto affix my signature in the presence of two witnesses.

CHARLES W. ALLEN.

Witnesses:
CHAS. M. CUSHMAN,
M. R. DODELS.